H. A. MULVANY & H. E. KENNEDY.
RECTIFIER.
APPLICATION FILED NOV. 24, 1915.

1,251,269.

Patented Dec. 25, 1917.

WITNESSES:
B. W. Dooling
L. J. Forde

INVENTORS
Harry A. Mulvany,
Harry E. Kennedy,
BY Strong & Baumsind
ATTORNEYS

UNITED STATES PATENT OFFICE.

HARRY A. MULVANY AND HARRY E. KENNEDY, OF BERKELEY, CALIFORNIA, ASSIGNORS TO ELECTRIC SALES SERVICE CO., OF SAN FRANCISCO, CALIFORNIA, A CORPORATION OF CALIFORNIA.

RECTIFIER.

1,251,269. Specification of Letters Patent. Patented Dec. 25, 1917.

Application filed November 24, 1915. Serial No. 63,220.

*To all whom it may concern:*

Be it known that we, HARRY A. MULVANY and HARRY E. KENNEDY, citizens of the United States, residing at Berkeley, in the county of Alameda and State of California, have invented new and useful Improvements in Rectifiers, of which the following is a specification.

This invention relates to a rectifier or selector of the point to the plate type, and particularly to a rectifier of this character which is intended for use in connection with X-ray or Röntgen tubes.

To operate the ordinary X-ray or Röntgen tubes high potential, unidirectional current is necessary. The present method of rectifying high voltages, which are produced by the combined action of an alternating current generator and a transformer, employs a mechanical rectifier, consisting of a rotating disk or spider driven synchronously with the electromotive force to be rectified. Due to many uncontrollable factors in this type, oscillations, destructive to the transformer, are set up. Installations requiring the rectification of over 100,000 volts require large spacing for insulation. A mechanical rectifier for high voltages must, therefore, be condemned, as the rotating disk or spider will necessarily be large in diameter to obtain the spacing required and correspondingly mechanically strong to resist the high peripheral velocities.

From the foregoing it will be seen that mechanical rectifiers as a whole are necessarily large in diameter, thereby producing high peripheral velocities which necessitate great mechanical strength, making the device inefficient and bulky. The noise of large rotating parts and the difficulty and multiplicity of parts to obtain synchronous operation combine to make such a device objectionable when applied to hospital work.

Static machines, electrolytic rectifiers, and vibratory interrupters hardly need any discussion as far as the present device is concerned, as they are seldom used at the present time.

The object of the present invention is to overcome or to eliminate the objectionable features in rectification heretofore ascribed to mechanical rectifiers, and to produce a rectifier which is simple, compact, easy to regulate, cheap to manufacture, and which will be, practically speaking, noiseless in operation. The present invention takes advantage of the difference of electrostatic field intensities surrounding electrodes of different areas. It, therefore, employs a pair of electrodes of different areas. Means are, furthermore, provided for effectively removing ionized air and metallic gases from between the electrodes and simultaneously cooling one electrode, and means are also provided for retaining the heat of the other electrode to permit generation of cathode rays, as will later be described. Further objects will hereinafter be described.

The invention consists of the parts and the construction and combination of parts as hereinafter more fully described and claimed, having reference to the accompanying drawings, in which—

Figure 1:
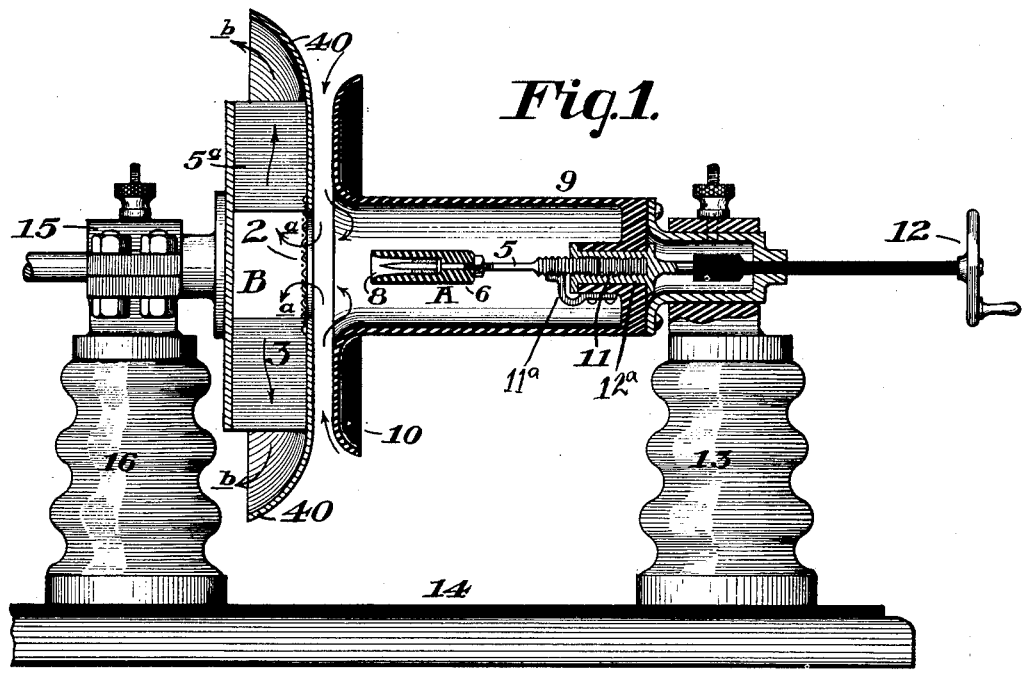
Figure 1 is a side elevation of the rectifier, partly in section.
Figure 2:
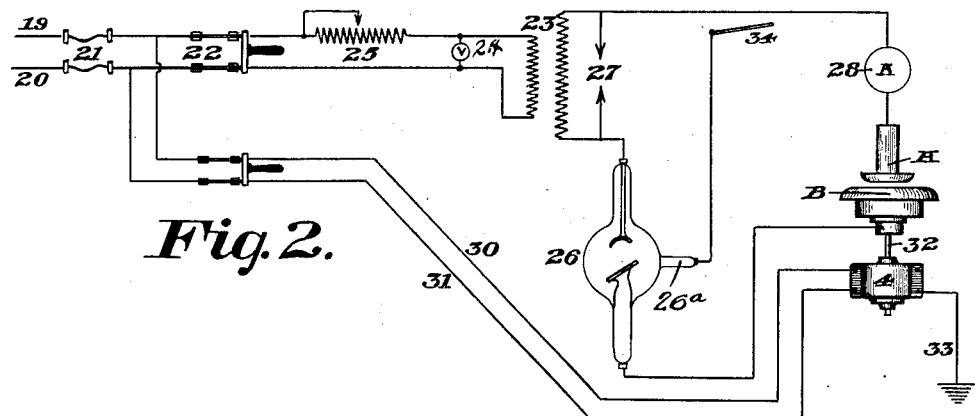
Fig. 2 is a diagrammatic view, showing the rectifier connected with an X-ray tube.
Figure 3:
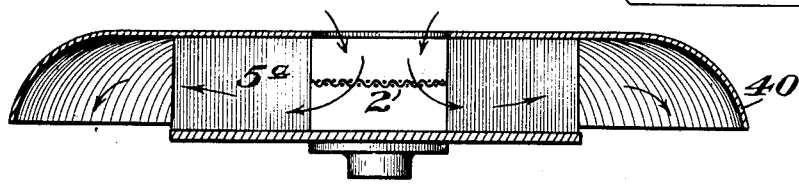
Fig. 3 is a modification showing the screen electrode mounted interiorly of the blower.

Referring in detail to the drawings, A indicates in general the point electrode and B the plate, which in this instance consists of a screen 2 which is secured to the intake end of a blower 3, driven by a motor 4, or any other suitable device. The point electrode consists of a rod 5, preferably tipped with a refractive metal. This rod is co-axially mounted interiorly of a receptacle 6, which is constructed of a high dielectric material. The inner end of the receptacle is hollow, as at 8, to form a shield for the outer exposed end of the electrode, and the electrode and the receptacle inclosing it are in turn surrounded by a discharge tube 9, one end of which is open and flanged, as at 10, while the other end is closed to prevent a direct passage of air through the tube and also to provide a support for the rod or point electrode. The point electrode is adapted to be moved to and from the screen by any suitable means, but, preferably, by a splined adjusting screw indicated at 11 which is engaged by a stationary key 11$^a$ and operated by the nut 12$^a$ and the extended hand wheel 12. The discharge tube, with inclosed point electrode and adjusting mechanism, is supported by an insulator 13, which in turn is mounted on a base 14.

The discharge tube 9 is preferably constructed of a high dielectric material and the air passes by the flanged mouth of the tube and directly through the screen 2 in the direction of the arrows $a$, then out through the vanes $5^a$ of the blower in the direction of arrows $b$. The blower may be incased, if desired, but is in this instance shown open and supported by an antifriction journal 15, secured on an insulator 16, which in turn is mounted on the baseplate 14.

The rectifier constructed as shown is used in connection with X-ray or Röntgen tubes. Referring to the diagrammatic view, its connection and operation in circuit with an X-ray tube will be as follows: 19 and 20 indicate a pair of wires which are connected with a source of electromotive force, such as an alternating current generator; 21 represents fuses; 22 the main throw-out switch; 23 a transformer; 24 a voltmeter; and 25 a variable resistance or inductance. 26 indicates a suitable form of X-ray tube; 27 a horn gap; 28 a hot wire M. A. meter; A the point electrode; B the screen and 4 the motor by which it is rotated. This motor may be directly connected with the main source of current supply through wires 30 and 31, and to isolate the high and low potential circuits of the rectifier and motor respectively it is preferable to provide an intermediate shaft 32 constructed of a high dielectric material. The motor is otherwise grounded in the usual manner by a wire 33, and a variable spark gap device 34 is interposed between the plate and the tube vacuum lowering device $26^a$ (if the tube is so equipped).

In operation, with the switch 22 closed and the motor 4 running, it will be seen that a current of air is constantly being drawn past the mouth of the discharge tube 9 and through the screen 2 and discharged in the direction of arrows $b$. The object of drawing the air past the tube and through the screen will hereinafter be apparent.

From the foregoing it will be seen that an alternating E. M. F. is applied to the electrodes. It is a commonly known phenomenon that a lower potential will discharge a point to a plate when the point is negative than when it is positive. The ratio between plus and minus electric pressures requisite to produce discharge holds for all gases that have come under our observation. Also the ratio of positive to negative discharge voltage is approximately constant throughout any reasonable pressure range, say, 5 cm. to 76 cm., while the ratio of ionic velocities of positive and negative ions throughout the same range is not constant, but increases at lower pressures.

In accordance with the above facts, when the point becomes negative a lower voltage is sufficient to discharge across the gap, that is, from the point to the screen, than when the point is positive, so that by setting the gap distance to a value consistent with the voltage to be rectified the discharge will occur only when the point is negative. This effect has been ascribed to the different ionic velocities, but the facts of pressure, etc., as mentioned above, would seem to discredit the theory, at least the whole phenomena cannot be explained by it although it has some bearing upon the matter.

The heating of the pointed electrode is one of the important features of the present invention. This heat is obtained by the passage of the current in discharging from the point. The temperature is thereby raised and the point gives out negatively charged particles on its own account.

The passage of the spark across the gap ionizes the air and also liberates a certain amount of metallic gases. This reduces the high dielectric qualities of the air, or, in other words, the ionized air and metallic gases form a path or conductor across the gap which would allow an alternating arc unless destroyed. The ionized air and gases are, however, effectively removed or so diluted after each discharge by the current of air passing by the mouth of the discharge tube and through the screen that reversal of the current flow cannot take place. The bombardment against the anode or the screen will tend to raise the temperature of same and introduce a counter-rectifying effect, due to reverse cathode rays. This is, however, overcome by the cooling effect of the air rushing through the screen and also by the constantly changing or moving surface of the revolving screen. In other words, the rotation of the screen prevents the spark from striking to one point only.

The provision of the discharge tube 9 is also one of the important features of the present invention as it provides means whereby a film of un-ionized air is formed between the electrodes. The discharge tube also forms a shield around the high potential surfaces of the point electrodes, thereby preventing ionized air formed around said surfaces from being drawn toward or through the screen. As a further means of removing ionized air, or, in other words, to prevent any return of air discharge by the blower, a flared annular disk 40 of suitable material is secured on one side of the blower. This disk deflects the air in the direction indicated, thereby preventing it from returning back between the mouth of the discharge tube and screen.

An explanation of the fact that a lower potential will discharge the gap when the point is negative may be had from the following considerations: In a discharge from a point we may assume that the discharge occurs in the following way: When the electric intensity surrounding the point reaches a certain value a short spark passes from the point to the air a little distance away, producing ions of both signs. When the point is negative, the positive ions are drawn to the negative electrode and by collision with the negative electrode and the surrounding air, produce electrons or corpuscles, which carry with the negative ions already present and being driven out, negative electricity. If the point be positive the positive ions are driven out and can only produce corpuscles by contact with the air.

The minimum potential to discharge the gap is determined by the condition that the electric field near the electrode should be strong enough to enable the positive ions to produce an adequate stream of electrons or corpuscles. When the point is negative the positive ions have two opportunities of producing corpuscles (small negatively electrified bodies of constant mass carriers of negative electricity): (1) by impact with the electrode; and (2) by impact with the molecules of gas, while, when the point is the anode, contact with the gas is the only means of producing the corpuscles. Hence, when the point is negative the stream of corpuscles is very much more adequate and, therefore, a lower potential will discharge the gap.

The following equation will indicate to what degree the different mobilities of the ions account for the action.

$$V = V' + \frac{P^{\frac{1}{2}} C^{\frac{1}{2}} A}{K_0^{\frac{1}{2}} C V_0^{\frac{1}{2}}}$$

V = potential of point.
V' = a constant.
C = a constant.
$V_0$ = minimum spark potential.
P = pressure.
A = radius of point.
$K_0$ = velocity of ion under consideration.

The above equation represents the condition for a luminous discharge. It will be seen that when the point is negative $K_0$ will be greater, since the negative ion travels at a greater velocity than the positive, and hence the value of $$\frac{P^{\frac{1}{2}}}{K_0^{\frac{1}{2}}}$$

will be less than when point is plus, thus enabling a lower potential to produce the discharge when the point is negative. If the rectification were due in its entirety to the different mobilities it will be seen that with pressures for which wide discrepancies of ionic velocity have been found similar voltage ratio variations should be noted.

When the distance between the point and screen is considerable, the minimum striking potential does not depend upon the spacing. However the current decreases rapidly as the distance is increased. For a given potential difference current $$I = K \times \frac{1}{d^{3.17}}$$

I = milli. amps.
K = constant.
d = spacing.

It will be seen that we have obtained a very excellent means of regulation. The current through the tube may be varied without changing the maximum applied voltage, by adjusting the spacing between the point and blower.

The preceding remarks concerning the rectification apply only to the first discharge with the air in its normal state. The first spark, however, ionizes the air so completely that it no longer has any insulating power and an arc ensues. The function of the blower is to remove the ionized air and establish the original conditions before the beginning of each discharge. In no way is the attempt made to alter ionic velocities by air blasts.

From the foregoing it will be seen that advantage has been taken of several important features. Means have been provided for retaining heat produced at the point electrode to permit a temperature at which cathode rays are produced. Means have also been provided for cooling and rotating the screen or plate electrode, and means have, furthermore, been provided for continuously removing ionized air and metallic gases generated by the passage of the spark between electrodes.

A simple, compact device or rectifier is in this manner produced which in actual practice is approximately ¼ of the size of the mechanical rectifier previously described. The current consumption of the tube can in the present instance be changed by varying the distance between the point and the screen without changing the value of the maximum applied E. M. F. In other words, the minimum striking potential to the tube does not change but the current decreases rapidly as the distance is increased until zero current value is reached. An excellent means of regulation is, therefore, obtained and the current through the X-ray tube may, therefore, be varied without changing the supply voltage. This is of great importance as the heat produced in the X-ray tube may thus be greatly reduced without changing the penetrating power of the rays which is maintained by high potentials.

The materials and finish of the several parts of the apparatus are such as the experience and judgment of the manufacturer may dictate.

We wish it understood that various changes in form, proportions and minor details of construction may be resorted to within the scope of the appended claims and that we do not wish to limit ourselves to the specific design and construction here shown.

Having thus described our invention, what we claim and desire to secure by Letters Patent is—

1. In a rectifier, a pair of electrodes, one of said electrodes comprising a metallic screen and the other a pointed rod, and means for forcing air through the screen.

2. In a rectifier, a pair of electrodes, one of said electrodes comprising a metallic screen and the other a pointed rod, means for forcing air through the screen, and means for revolving the screen.

3. In a rectifier, a pair of electrodes, one of said electrodes comprising a metallic screen and the other a pointed rod, means for retaining the point electrode at a high temperature, and means for cooling the screen.

4. In a rectifier, a pair of electrodes, one of said electrodes comprising a metallic screen and the other a pointed rod, means for retaining the point electrode at a sufficiently high temperature to establish a discharge of cathode rays, and means for producing an air current which passes over and through the screen electrode to remove ionized air and metallic gases from between the electrodes and to cool the screen electrode.

5. In a rectifier, a pair of electrodes, one of said electrodes comprising a metallic screen and the other a pointed rod, means for forcing air through the screen, and means for adjusting the spacing between the electrodes.

6. In a rectifier, a pair of electrodes, one of said electrodes comprising a metallic screen and the other a pointed rod, means for forcing air through the screen, and means for adjusting the point electrode to and from the screen electrode.

7. In a rectifier, a pair of electrodes, one of said electrodes comprising a metallic screen and the other a pointed rod, means for retaining the point electrode at a high temperature, means for cooling the screen, and means for adjusting the spacing between the electrodes.

8. In a rectifier, a pair of electrodes, one of said electrodes comprising a metallic screen and the other a pointed rod, means for retaining the point electrode at a sufficiently high temperature to establish a discharge of cathode rays, means for producing an air current which passes over and through the screen electrode to remove ionized air and metallic gases from between the electrodes and to cool the screen electrode, and means for adjusting the spacing between the electrodes.

9. A rectifier comprising a pointed rod, an insulator partly inclosing the rod, an annular shield-like extension on the insulator surrounding the point of the rod, and a second electrode consisting of a metallic screen.

10. A rectifier comprising a pointed rod, an insulator partly inclosing the rod, an annular shield-like extension on the insulator surrounding the point of the rod, a second electrode consisting of a metallic screen, and means for rotating the screen.

11. A rectifier comprising a pointed rod, an insulator partly inclosing the rod, an annular shield-like extension on the insulator surrounding the point of the rod, a second electrode consisting of a metallic screen, and means for forcing air through the screen.

12. A rectifier comprising a pointed rod, an insulator partly inclosing the rod, an annular shield-like extension on the insulator surrounding the point of the rod, a second electrode consisting of a metallic screen, means for rotating the screen, and means for forcing air through the screen.

13. A rectifier comprising a pointed rod, an insulator partly inclosing the rod, an annular shield-like extension on the insulator surrounding the point of the rod, a rotary blower, and a second electrode carried by the blower, said electrode comprising a metallic screen extending across the intake opening of the blower.

14. A rectifier comprising a pointed rod, an insulator partly inclosing the rod, an annular shield-like extension on the insulator surrounding the point of the rod, a rotary blower, a second electrode carried by the blower, said electrode comprising a metallic screen extending across the intake opening of the blower, and means for adjusting the pointed electrode to and from the screen electrode.

15. A rectifier comprising a pointed rod, an insulator partly inclosing the rod, an annular shield-like extension on the insulator surrounding the point of the rod, a rotary blower, a discharge tube surrounding the point electrode and spaced from the intake of the blower, and a second electrode carried by the blower, said electrode comprising a metallic screen secured between the intake opening of the blower and the discharge tube.

16. A rectifier comprising a pointed rod, an insulator partly inclosing the rod, an annular shield-like extension on the insulator surrounding the point of the rod, a rotary blower, a discharge tube surrounding the point electrode and spaced from the intake of the blower, a second electrode carried by the blower, said electrode comprising a metallic screen secured between the intake opening of the blower and the discharge tube, and means for adjusting the pointed electrode to and from the screen electrode.

17. In a selector, a pair of electrodes, means for retaining one of the electrodes at a sufficiently high temperature to establish a discharge of cathode rays, and means for passing an air current between the electrodes.

18. In a selector, a pair of electrodes, one of said electrodes comprising a perforated member and the other a pointed rod, means for retaining the point electrode at a sufficiently high temperature to establish a discharge of cathode rays against the perforated electrode, and means for cooling the perforated electrode.

19. In a selector, a pair of electrodes, one of said electrodes comprising a perforated member and the other a pointed rod, means for maintaining the point electrode at a sufficiently high temperature to establish a discharge of cathode rays against the perforated electrode, and means for passing an air current between the electrodes.

20. In a selector, a pair of electrodes, one of said electrodes comprising a perforated member and the other a pointed rod, means for maintaining the point electrode at a sufficiently high temperature to establish a discharge of cathode rays against the perforated electrode, and means for passing an air current through the perforated electrode.

21. In a selector, a pair of electrodes, one of said electrodes comprising a foraminated member and the other a pointed rod, and means for forcing an air current between said electrodes.

22. In a selector, a pair of electrodes, one of said electrodes comprising a foraminated member and the other a pointed rod, and means for forcing air through the foraminated electrode.

23. In a selector, a pair of electrodes, one of said electrodes comprising a foraminated member and the other a pointed rod, means for forcing air through the foraminated electrode, and means for revolving the foraminated electrode.

24. A selector comprising an electrode, a shield-like extension surrounding or partly surrounding said electrode to permit the outer end of the electrode to obtain a sufficiently high temperature to discharge cathode rays, a second electrode consisting of a foraminated material, and means for forcing an air current through said foraminated electrode.

25. A selector comprising an electrode, a shield-like extension surrounding or partly surrounding said electrode to permit the outer end of the electrode to obtain a sufficiently high temperature to discharge cathode rays, a second electrode consisting of a foraminated material, means for forcing an air current through said foraminated electrode, said means comprising a fan mounted on one side of said electrode.

26. A selector comprising a rod electrode, a shield-like extension partly inclosing said electrode to permit the outer end of the electrode to obtain a sufficiently high temperature to discharge cathode rays, a second electrode consisting of a foraminated material, and means for creating a suction on the side of the foraminated electrode which is opposite the rod electrode to permit a current of air to pass through said foraminated electrode.

In testimony whereof we have hereunto set our hands in the presence of two subscribing witnesses.

HARRY A. MULVANY.
HARRY E. KENNEDY.

Witnesses:
JOHN H. HERRING,
THOS. CASTBERG.